Figure 1:
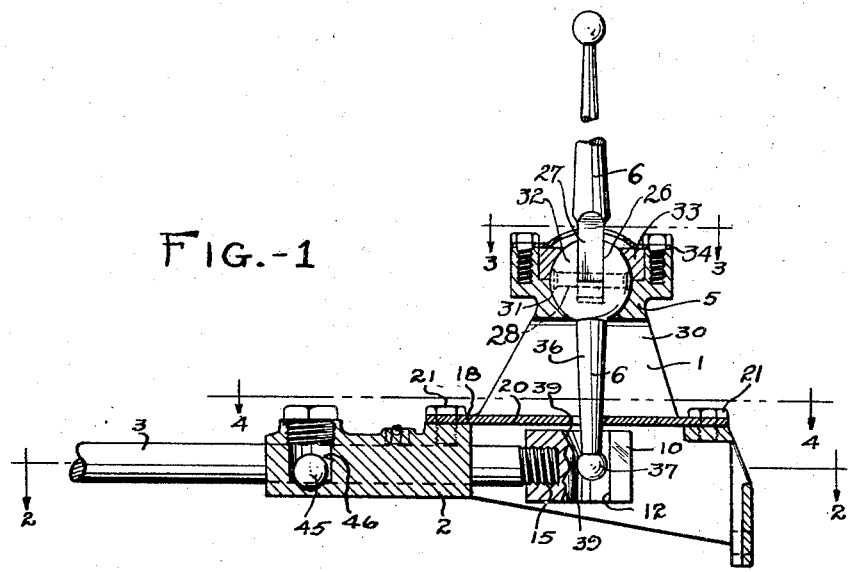

Dec. 28, 1926.

C. E. F. AHLM 1,611,865

GEAR SHIFTING MECHANISM

Filed July 8, 1925

2 Sheets-Sheet 1

Inventor

Charles E. F. Ahlm

By Davis, Macklin, Golrick & Teen

Attorneys

Dec. 28, 1926.

C. E. F. AHLM 1,611,865

GEAR SHIFTING MECHANISM

Filed July 8, 1925     2 Sheets-Sheet 2

Inventor

Charles E. F. Ahlm.

By Bates, Macklin, Golrick & Fears

Attorneys

Patented Dec. 28, 1926.

1,611,865

UNITED STATES PATENT OFFICE.

CHARLES E. F. AHLM, OF CLEVELAND, OHIO.

GEAR-SHIFTING MECHANISM.

Application filed July 8, 1925. Serial No. 42,132.

This invention relates to gear shifting mechanism, and the object is to provide a simple and convenient arrangement for effecting a quick and easy slide shift of gear or clutch members to change from one speed to another.

More specifically, it is an object to combine the usual longitudinal and transverse movement required of an operating member to selectively engage and shift a pair of independently shiftable members, into one unidirectional movement, while maintaining effectiveness and certainty of operation. A further object is to combine with such mechanism means for preventing the accidental shifting of one of a pair of longitudinally shiftable members when the shifting member therefor is in engagement with the other of the pair. A further specific object is to provide a gear shifting mechanism in which the necessary longitudinal and transverse movement of a member cooperating selectively with two movable members is translated to a straight forward and backward movement of a hand lever.

Further objects and features of my invention will appear in the detailed description that follows which relate to the accompanying drawings. The essential novel characteristics are set out in the claims.

A very widely used form of gear shifting mechanism includes a pair of slidable bars suitably connected to the gear or clutch members to be shifted, each bar being provided with open throats for receiving the end of a shifting lever and means such as a guide plate is commonly used to direct the path of the shifting lever into and out of the desired throat and guide the lever while making the shift. The type of guide usually employed comprises a plate, having an H shaped opening therethrough. If it is desired to shift one bar in one direction from a given position, and the other in the opposite direction, only the diagonally opposite arms of the H are provided. My invention is particularly concerned with this latter type.

The guide plate which I propose to use has a lever guide opening in the nature of a compound curve so arranged that the manual operation of the lever may simply necessitate a general forward or backward movement to effect a complete shift of both bars, as contracted with a forward crosswise and further forward movement necessitated by the common type of shift. I have been able to accomplish this without the use of complicated or extra parts, the manufacturing cost of my improvement being substantially the same as required by the usual arrangement.

Figure 2:
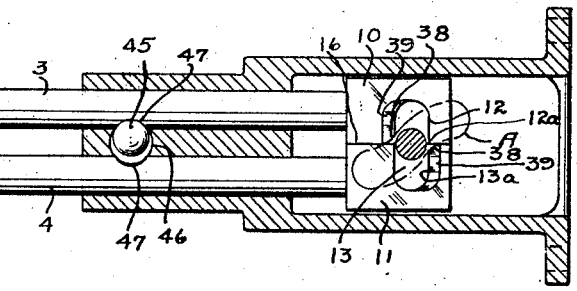
Figure 3:
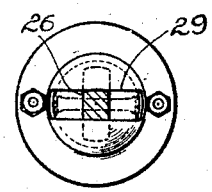
Figure 4:
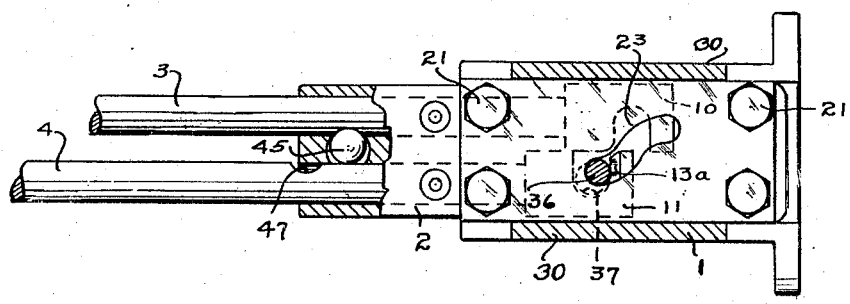
Figure 5:
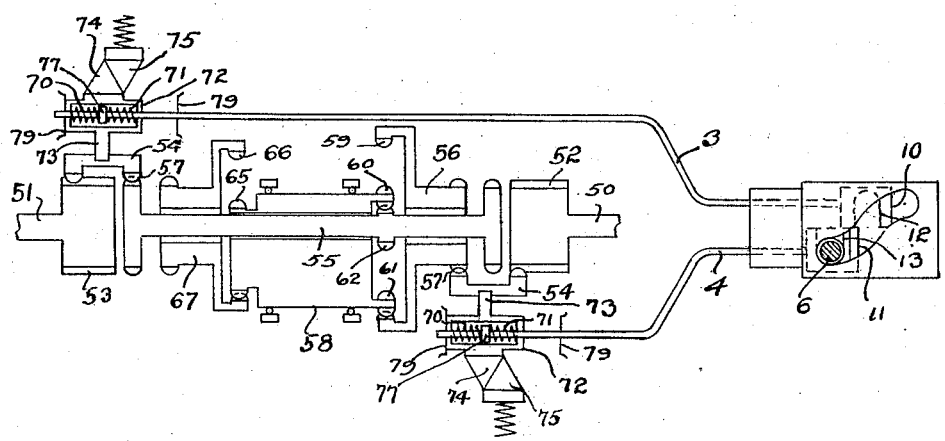

In the drawings, Fig. 1 is a substantially central longitudinal section through my preferred form of shifting mechanism; Fig. 2 is a horizontal sectional plan as indicated by the lines 2—2 on Fig. 1; Fig. 3 is a fragmentary sectional plan as indicated by the line 3—3 on Fig. 1; Fig. 4 is a sectional plan similar to Fig. 2 as indicated by the line 4—4 on Fig. 1; Fig. 5 is a diagram showing my mechanism arranged to effect gear speed changes in connection with a particular type of transmission.

Referring in detail to the drawings, and indicating the various parts by numerals, 1 represents a general frame which as shown may comprise a main casting having a bearing portion 2, adapted to slidably support a pair of shifting bars or rods 3 and 4, and a bracket 5 arranged to pivotally support the usual shifting lever 6, which cooperates with the bars. The bars which are shown as extending through the bearing portion may be provided with shifter heads 10 and 11 having open inwardly facing throats as indicated at 12 and 13. The heads may be secured to the respective bars in any manner as by the threaded engagement indicated at 15. I have shown the heads as bearing against each other along their adjacent surfaces whereby the respective vertical surfaces of each throat may be maintained parallel to the other.

The shifter lever guide may be embodied in a plate 20, supported by a substantially flat surface 18 on the casting 1, to which the plate is preferably secured as by screws 21. As illustrated in Fig. 4, the plate is provided with a slot 23 in the nature of an ogee or compound curve, the respective ends of which gradually curve laterally, one forwardly and the other rearwardly. These slots guide the lower end of the lever into and out of the throats consequent upon throwing the upper end of the lever forwardly or rearwardly as will be later set out more in detail.

The bracket 5 may be supported by side webs 30 on either side of the plate 20 which terminate in a socket portion 31 for receiving the usual ball portion 32 of the lever 6.

The ball is shown as held in place by an annular member 33 having a spherical surface complementary to the ball.

In order that the swing of the upper end of the lever may be in a straight path with reference to the operator as contrasted with the usual sideward swing of this lever, as ordinarily employed, I may provide a universal movement between the upper and lower end of the lever. A simple arrangement for accomplishing this may comprise a slot 26 in the ball 32, the lower end of the lever indicated at 27 being set in the slot and secured as by a pivot pin 28, to the ball. A plate 34 overlying the member 33 is shown as provided with a longitudinal slot 29 which will permit only the rectilinear movement of the portion 27 of the lever, while allowing the lower end to follow the guide.

The lower end of the lever designated 36 extends through the curved slots 23 and is shown as provided with a ball end 37 arranged to engage alternately one of the throats 12 or 13 of the respective shifting head. By reason of the camming action of the guide slot 23 against the lever, when moved, the path described by this ball end is substantially that indicated in broken lines at A in Fig. 2. In connection with this figure, it will be noted that a vertical surface of each throat has a beveled off or rounded portion 38 to allow the ball end 37, in being carried from engagement with one of the throats and into the other, to clear the previously engaged throat without carrying its head forwardly, or rearwardly as the case may be, beyond the normal position. By reason of these rounded corners, the ball is permitted to leave the throat just engaged with a diagonal (forward or rearward) movement, while as soon as the ball has been moved past this corner, a snug engagement between the ball and the other throat for the remainder of the shifting movement is maintained. This feature also permits the heads to be close together, even touching as previously mentioned, while permitting the easy uni-directional shift.

When the heads are shifted out of the normal position, as the head 11 in Fig. 4, the arm 36 extends downwardly at an angle, and to permit this while maintaining a fairly close contact between the end of the arm and both side surfaces of the throats, I preferably cut away the upper corner adjacent one of the side surfaces of each throat as at 39.

It will be understood from the above description, that when the parts are in the position shown in Fig. 4, a rearward swinging of the lever will cause its lower end to bear against the surface 13ª of the throat 13 to carry the head 11 forwardly, where by reason of the bevel 38 at the opening of the throat 13, the ball will entirely clear the head 11 and leave it exactly in the position shown in Fig. 2. At the same time, the bevel 38 on the other head permits the ball 37 to move into the throat 12 while guided in a fixed path by reason of the slot 23, with just enough clearance to insure free movement, and as the guide slot cams the lever over, a reasonably close fit is maintained between both side surfaces of the throat 12 and the ball.

It is within the spirit of my invention to provide a unitary lever as well as that just described, and in this case the compound curve described by the lower end of the lever as limited by the guiding slot when translated to the operating end of the lever 6, becomes a very gradual one and thus shifting is made by my arrangement an exceedingly simple operation. Moreover, due to the close contact maintained at all times between the lower end of the lever and the respective heads, the lever will not be subject to vibration. It will be further seen that manipulation of the lever by reason of the uni-directional movement may be accomplished as rapidly as desired, without danger of strain or excessive wear on the various parts.

As a safeguard against displacement of either of the heads when disengaged by the lever, and to make the shifting mechanism more complete in a unit, I preferably provide means whereby when one of the bars is shifted out of its normal position shown in Fig. 2, the other bar will be positively held in place. To this end I may employ a ball 45, loosely fitting a recess 46 in the bearing portion of the frame. The bars are shown as provided with concave recesses as at 47, oppositely disposed when the bars are in such normal position. When one of the bars is shifted as in Fig. 4, the ball is forced and held in the concavity in the other bar by the plain surface of the shifted bar, where it retains the non-shifted bar against accidental movement in either direction. Such an arrangement will effectually prevent any damage to the mechanism and further insure precision of operation.

When combined with a shifting arrangement such as shown in my prior application, Serial No. 15,480, filed March 14th, 1925, the ball arrangement just described may be eliminated. Fig. 5 shows diagrammatically the mechanism described and claimed in that application in connection with the gearing adapted to deliver a plurality of speeds. In this figure, 50 and 51 represent driving and driven members having clutch teeth 52 and 53 respectively. The clutch teeth 52 and 53 are arranged to be engaged by dental clutch members 54 and 54′, the former adapted to connect the member 50 with either an intermediate shaft 55 or a gear 56 freely journalled about the shaft. The members 54 and 54′ are arranged to slide with reference to their respective teeth 52 or 53 to allow teeth 57 to shift into engagement with teeth rigid with either the shaft 55 or respective gear members 56 or 67.

When the heads 10 and 11 of my just described shifting mechanism are both in their rearward position as shown in the diagram, the gear 56 is rotated at the same speed as the driving shaft which in turn rotates an internal-external eccentrically mounted gear member 58 through gear teeth 59 and 60 at a higher speed, which gear member in turn rotates the intermediate shaft 55 through gear teeth 61 and 62 at a still higher speed. In this position of the heads the intermediate shaft 55 is connected directly to the driven shaft. Direct drive is had when both heads 10 and 11 are in the normal position. In this condition the members 54 and 54' connect both the driving and driven members to the intermediate shaft 55. In the third position, with the head 10 shifted forwardly (the other head remaining in the normal position), the driving shaft is still coupled to the intermediate shaft and the driven shaft to the gear 67. Then the gearing operates as an increased speed transmission, power being delivered through the intermediate shaft and gears 62 and 61 to the member 58, which through the gear teeth 65 and 66 drives the member 67 now connected with the driven shaft.

The bars 3 and 4 are each resiliently connected to their respective clutch members 54 or 53 by a pair of coil springs 70 and 71, each arranged to bear against one end of a shackle member 72 connected as by a shifter finger 73 to the respective clutch members 54 or 54'. This shackle member carries a wedge shaped point 74 arranged to cam against a similarly wedge shaped plunger 75 to retract the plunger whenever the member 72 is being shifted from one position to another.

In operation, assuming the bar 4 is shifted forwardly from the position shown in the diagram, the spring 71 will first be compressed by a block 77 rigid with the bar and further movement will cause the plunger 75 to be cammed outwardly until the wedge points are aligned upon which the spring 71 will expand and push the shackle member beyond this dead center position. The spring of the plunger then acts to cam the shackle member still further to the right and to hold the member 72 against an abutment 79, thus holding the bar 3 against shifting out of its new position. Similar abutments 79 are provided to limit both the forward and backward movement of each shackle member thus insuring the heads 10 and 11 of the previously described shifting mechanism being maintained in their proper relation to the movement of the shifter lever 6.

It will be seen that I have provided a gear shifting mechanism which will operate effectively with gearing and clutch arrangements adapted to be operated by a bar shift and which may be operated with the least possible manual effort. I am aware that changes may be made in the construction while keeping within the spirit of my invention and do not therefore wish to limit myself to the particular embodiment shown.

Having thus described my invention, I claim:

1. In combination, in a gear shifting mechanism, means for effecting the longitudinal shifting of a pair of members from a normal position, a curved guide for said means whereby such shifting may be accomplished by a general forward or rearward movement of the shifting means, manually operated means connected to the first named means, another guide for controlling the movement of the manual operating means whereby said latter means moves only in a rectilinear path.

2. In combination, a pair of members arranged to be shifted one forwardly and the other rearwardly from a given position, and means arranged to engage the members alternately and pass from one to the other, while both members are in said given position, said means including a curved guide whereby the shifting movement may be in a single general direction.

3. In combination, a pair of longitudinally shiftable members, and an operating member selectively cooperating therewith, and a guide for the operating member comprising a plate having a compound curved slot embracing the operating member.

4. In combination, a pair of members to be shifted, one of said members being arranged to be shifted forwardly, the other rearwardly, abutment surfaces carried by each of said members, and a shifting member arranged to engage alternately the abutment surfaces of the respective members, and means including a guide in the form of a double curve, whereby the guide cams the shifting member out of engagement with the abutment surface on one member to be shifted and into engagement with the other.

5. In combination, a pair of members to be longitudinally shifted, abutment surfaces carried by each of said members, and a shifting member arranged to engage alternately the abutment surfaces of the respective members, and means including a guide in the form of a double curve, whereby the guide cams the shifting member out of engagement with the abutment surface on one member to be shifted and into engagement with the other, consequent upon a general forward or rearward movement of said shifting member.

6. In combination with a gear shift, a pair of members to be longitudinally shifted, each of said members having an abutment surface, a guide, and means cooperating with the guide and engaging the abutment surfaces alternately, said guide being in the nature of a compound curve having a portion intermediate its ends extending at the greatest angle to the axes of the members, and means whereby said shifting means may be moved in a single general direction along the curve and disengage one of the abutment surfaces at the intermediate portion of the curve, and engage the other.

7. In combination with a gear shifting mechanism, a pair of members to be shifted, throats in said members facing toward each other, a member extending into position to engage either of said throats to carry the selected member forwardly or rearwardly, and opposed curved cam surfaces to translate a general longitudinal movement of said engaging member into a transverse movement into and out of the desired throat.

8. In combination, a pair of longitudinally shiftable members, a shifting lever selectively cooperating therewith, and a guide for said lever in the nature of an ogee curve, having its end portions extending in the general direction of the axes of the shiftable members and the intermediate portion at an acute angle relative thereto, whereby an abrupt cam surface is had to move the shifting member quickly from one shiftable member to the other at the intermediate zone when the lever is swung in a direction parallel to said axes.

9. In combination, a pair of members each provided with throats facing toward each other, an operating member adapted to selectively engage the throats, and a guide for the operating member arranged to cam the operating member out of engagement with one of the throats and into engagement with the other, and means including a rounded corner on each of the throats, whereby the shift from one throat to another may be in a diagonal path, and whereby when the operating member is moved past the rounded corner, a close engagement between the throat and opposite sides of the operating member is maintained.

10. In combination with a pair of shiftable bars, each provided with an open throat, a lever arranged to selectively enter the throat to shift the bars, means for gradually camming the lever out of engagement with one of the throats and into engagement with the other when the lever is swung forwardly or rearwardly, and means for holding the non-shifted bar against accidental movement while the lever is engaging the other bar.

11. In combination with a pair of shiftable bars, each provided with an open throat, a member arranged to selectively enter the throats to shift the bars, means for camming said member out of engagement with one of the throats and into engagement with the other when said member is moved forwardly or rearwardly, and resilient means for holding the non-shifted bar against accidental movement while the member is engaging the other bar.

12. In combination, in a gear shifting mechanism, a pair of bars to be shifted, open throats carried by each of said bars, a lever arranged to selectively engage the throat, a cam guiding slot for directing the path of the lever into and out of the throats, and means whereby the upper end of the lever may be guided in a straight path irrespective of transverse movement of the lower end of the lever.

13. In combination, with a gear shifting member, a frame, a pair of bars supported by the frame and arranged to be shifted longitudinally relative thereto, an abutment carried by each of the bars, an operating lever pivoted to the frame and arranged to selectively engage the abutment, a guide in the nature of a cam for causing the lever to disengage the abutment on one of the bars and to engage the other consequent upon the lever being moved, and means associated with the pivot, whereby the lower end of the lever may have longitudinal and transverse movement, while the upper end of the lever is guided in a straight path.

In testimony whereof, I hereunto affix my signature.

CHARLES E. F. AHLM.